US012112753B2

United States Patent
Lee et al.

(10) Patent No.: US 12,112,753 B2
(45) Date of Patent: Oct. 8, 2024

(54) METHOD AND MOBILE DEVICE FOR PROCESSING COMMAND BASED ON UTTERANCE INPUT

(71) Applicant: SAMSUNG ELECTRONICS CO., LTD., Suwon-si (KR)

(72) Inventors: Jongsun Lee, Suwon-si (KR); Seonghan Ryu, Suwon-si (KR); Hyungrai Oh, Suwon-si (KR); Hojung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 17/698,671

(22) Filed: Mar. 18, 2022

(65) Prior Publication Data
US 2022/0270607 A1 Aug. 25, 2022

Related U.S. Application Data

(63) Continuation of application No. PCT/KR2022/002431, filed on Feb. 18, 2022.

(30) Foreign Application Priority Data

Feb. 19, 2021 (KR) .................. 10-2021-0022598

(51) Int. Cl.
*G10L 15/22* (2006.01)
*G10L 15/065* (2013.01)

(52) U.S. Cl.
CPC ............ *G10L 15/22* (2013.01); *G10L 15/065* (2013.01); *G10L 2015/223* (2013.01); *G10L 2015/228* (2013.01)

(58) Field of Classification Search
CPC . G10L 15/22; G10L 15/065; G10L 2015/223; G10L 2015/228; G10L 2015/226; G06F 3/167
See application file for complete search history.

(56) References Cited

U.S. PATENT DOCUMENTS 10,720,160 B2 * 7/2020 Schramm ............... G10L 15/30
10,964,327 B2   3/2021 Lee et al.
(Continued)

FOREIGN PATENT DOCUMENTS

KR   10-0378674 B1   4/2003
KR   10-0506168 B1   8/2005
(Continued)

OTHER PUBLICATIONS

KR20190141109A-original—Machine translation of a Korean patent (Year: 2019).*
(Continued)

*Primary Examiner* — Bhavesh M Mehta
*Assistant Examiner* — Darioush Agahi
(74) *Attorney, Agent, or Firm* — Sughrue Mion, PLLC

(57) ABSTRACT

A mobile device includes: a location sensor configured to detect a location of the mobile device; a timer; a microphone configured to receive an utterance input of a user; a communication interface; a memory; and a processor. The processor is configured to execute one or more instructions stored in the memory to extract, from the utterance input of the user, element information corresponding to a command controlling a target device and detection condition information of the target device; detect first context information using the location sensor and the timer; determine whether the detected first context information satisfies the detection condition information of the target device; and process the command corresponding to the element information of the command, based on a result of the determination.

13 Claims, 10 Drawing Sheets

(56) References Cited

U.S. PATENT DOCUMENTS

| | | | |
|---|---|---|---|
| 11,037,562 B2 | 6/2021 | Shah et al. | |
| 11,223,936 B2 | 1/2022 | Park et al. | |
| 2003/0191880 A1* | 10/2003 | Lin | G06F 13/3625 |
| | | | 710/116 |
| 2005/0210475 A1* | 9/2005 | Hepworth | G06F 9/465 |
| | | | 719/310 |
| 2013/0067375 A1* | 3/2013 | Kim | G06F 3/04817 |
| | | | 715/769 |
| 2014/0070925 A1 | 3/2014 | Shin et al. | |
| 2018/0004216 A1* | 1/2018 | Ferman | G01S 19/51 |
| 2019/0279626 A1 | 9/2019 | Wang et al. | |
| 2021/0255826 A1* | 8/2021 | Devine | G06F 3/167 |
| 2021/0350799 A1* | 11/2021 | Hansen | H04L 67/14 |

FOREIGN PATENT DOCUMENTS

| | | |
|---|---|---|
| KR | 10-1465230 B1 | 11/2014 |
| KR | 10-2017-0085479 A | 7/2017 |
| KR | 10-1909498 B1 | 10/2018 |
| KR | 10-2019-0141109 A | 12/2019 |
| KR | 20190141109 A * | 12/2019 |
| KR | 10-2020-0127814 A | 11/2020 |
| KR | 10-2020-0128725 A | 11/2020 |
| KR | 10-2021-0010501 A | 1/2021 |

OTHER PUBLICATIONS

Communication dated Jun. 2, 2022 issued by the International Searching Authority in counterpart Application No. PCT/KR2022/002431 (PCT/ISA/220, PCT/ISA/210, and PCT/ISA/237).

* cited by examiner

METHOD AND MOBILE DEVICE FOR PROCESSING COMMAND BASED ON UTTERANCE INPUT

CROSS-REFERENCE TO RELATED APPLICATIONS

This application is a Continuation Application of International Application PCT/KR2022/002431 filed on Feb. 18, 2022, which claims benefit of Korean Patent Application No. 10-2021-0022598 filed on Feb. 19, 2021, at the Korean Intellectual Property Office, the disclosures of which are incorporated herein in their entireties by reference.

TECHNICAL FIELD

The disclosure relates to a method and mobile device for processing a command based on an utterance input.

BACKGROUND ART

Natural language processing is technology for analyzing and processing a natural language of a human being by using a computer, and is a term including natural language analysis, natural language understanding, natural language generation, and the like. Natural language processing is a major field of artificial intelligence, and recently, deep learning technology is being used beyond statistical natural language processing techniques and machine learning using corpus data.

Internet of things (IoT) refers to a technology or environment in which data is exchanged between devices by attaching sensors to the devices. In an IoT environment, devices connected to the Internet may exchange information without the assistance of a human being.

DESCRIPTION OF EMBODIMENTS

Technical Problem

Provided are a method, performed by a mobile device, of processing a command based on an utterance input of a user so as to control a target device when the target device is in a different Internet of things (IoT) environment from that of the mobile device carried by the user, and a mobile device therefor.

Technical Solution to Problem

In accordance with an aspect of the disclosure, a method, performed by a mobile device, of processing a command based on an utterance input of a user, includes extracting, from the utterance input of the user, element information corresponding to the command controlling a target device and detection condition information of the target device; detecting first context information using a location sensor and a timer; determining whether the detected first context information satisfies the detection condition information; and processing the command corresponding to the element information, based on a result of the determining.

In accordance with an aspect of the disclosure, a non-transitory computer-readable recording medium having recorded thereon a program to be executed on a computer includes instructions for extracting, from an utterance input of a user, element information corresponding to a command controlling a target device and detection condition information of the target device; detecting first context information using a location sensor and a timer; determining whether the detected first context information satisfies the detection condition information; and processing the command corresponding to the element information, based on a result of the determination.

In accordance with an aspect of the disclosure, a mobile device includes a location sensor configured to detect a location of the mobile device; a timer; a microphone configured to receive an utterance input of a user; a communication interface; a memory storing one or more instructions; and a processor configured to execute the one or more instructions to extract, from the utterance input of the user, element information corresponding to a command controlling a target device and detection condition information of the target device; detect first context information using the location sensor and the timer; determine whether the detected first context information satisfies the detection condition information; and process the command corresponding to the element information, based on a result of the determination.

MODE OF DISCLOSURE

Figure 1:
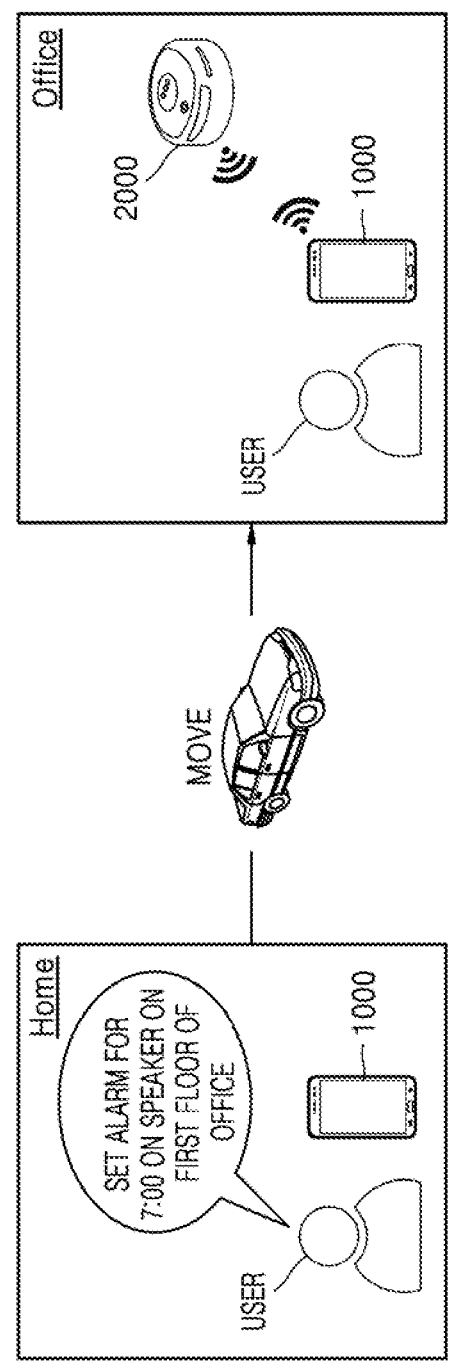
FIG. 1 is a diagram for describing that a mobile device and a target device are in different Internet of things (IoT) environments, according to an embodiment.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the drawings such that one of ordinary skill in the art may easily implement the embodiments of the disclosure. The disclosure may be implemented in various different forms and is not limited to the embodiments of the disclosure described herein.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

Further, the terms including ordinal numbers such as "first", "second", and the like used in the present specification may be used to describe various components, but the components should not be limited by the terms. The above terms are used only to distinguish one component from another.

Embodiments of the disclosure relate to a method and mobile device for processing a command based on an utterance input, and detailed descriptions about matters well-known to one of ordinary skill in the art will be omitted.

In the disclosure, an utterance input denotes an input by utterance including one or more words. For example, the utterance input is an utterance including one or more nouns or verbs, and may include, for example, an utterance including a noun, an utterance including a noun phrase, an utterance including a verb, or an utterance including a verb phrase.

In the disclosure, a mobile device is a user terminal that may be carried by a user, and may be a smart phone, a portable computing device, or a wearable device.

In the disclosure, a target device is a device to be controlled by a user by using a mobile device, and may be an electronic mobile device or electronic product capable of communicating with the mobile device. For example, the target device may be a home assistant, an artificial intelligence speaker, a television (TV), an air conditioner, or a robot cleaner.

In the disclosure, a command is an instruction for controlling a target device and may be generated from an utterance input of a user. The command may be an instruction of a first type capable of immediately controlling the target device, an instruction of a second type of a level processable by the target device, or an instruction of a third type classified according to each information field after natural language processing.

In the disclosure, element information of a command denotes information about an element of the command, and for example, may be identification information of the target device or information about a function to be performed by the target device.

In the disclosure, detection condition information of a target device denotes information corresponding to a prerequisite for detecting the target device, and may be, for example, location information or time information.

In the disclosure, context information denotes information defining features of a situation, such as a location (place) time, an object, and a person, which affect an interaction between devices or between applications of a device.

FIG. 1 is a diagram for describing that a mobile device 1000 and a target device 2000 are in different Internet of things (IoT) environment, according to an embodiment of the disclosure.

The mobile device 1000 is installed with a voice assistant application, and thus is able to receive an utterance input of a user, and generate and manage a command corresponding to the received utterance input. The mobile device 1000 may perform short-range communication with adjacent devices in an on-device IoT environment to transmit the command based on the utterance input. A device (e.g., target device) that has received the command from the mobile device 1000 may perform a function or operation corresponding to the received command.

As shown in FIG. 1, when the mobile device 1000 is at home and the target device 2000 is in an office, i.e., when the mobile device 1000 and the target device 2000 are in different IoT environments, the mobile device 1000 is unable to control the target device 2000 in a remote IoT environment. To control the target device 2000 at a long distance, the mobile device 1000 may perform remote control via the Internet, or move to the IoT environment where the target device 2000 is present and then transmit a command to the target device 2000 via an utterance input.

In this case, the user of the mobile device 1000 needs to input the utterance input in consideration of a communication connection between the target device 2000 and the mobile device 1000, and thus user convenience is low and user experience is inconsistent. Also, when an operation of continuously detecting the target device 2000 is repeated until the mobile device 1000 detects the target device 2000 and transmits the command, power consumption of the mobile device 1000 may be wasted. For example, when the mobile device 1000 continuously performs an operation of scanning detection signals of adjacent devices to detect the target device 2000, a battery of the mobile device 1000 may be quickly discharged.

Hereinafter, controlling, by the mobile device 1000, of the target device 2000 in a remote on-device IoT environment via a command based on an utterance input will be described in detail.

Figure 2:
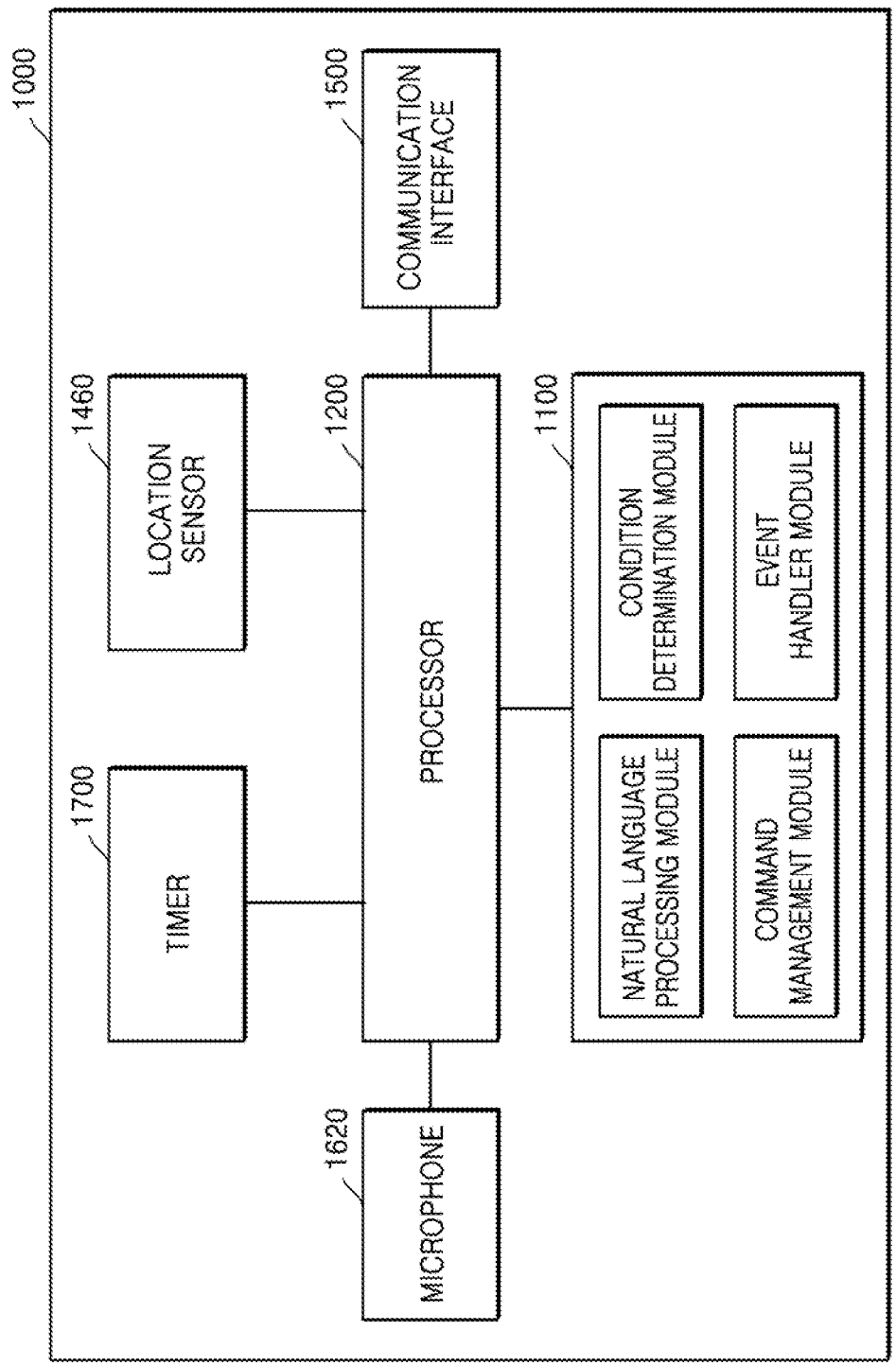
FIG. 2 is a block diagram for describing a configuration of a mobile device, according to an embodiment.

FIG. 2 is a block diagram for describing a configuration of the mobile device 1000, according to an embodiment of the disclosure.

Referring to FIG. 2, the mobile device 1000 may include a memory 1100, a processor 1200, a location sensor 1460, a communication interface 1500, a microphone 1620, and a timer 1700. In addition, the mobile device 1000 may further include components such as a power supply for supplying power to the mobile device 1000, and the mobile device 1000 may further include general-purpose components other than those shown in FIG. 2.

The memory 1100 may store instructions executable by the processor 1200. The memory 1100 may store a program including the instructions. The memory 1100 may include, for example, a hardware device of at least one type among random-access memory (RAM), static RAM (SRAM), read-only memory (ROM), flash memory, electrically erasable programmable ROM (EEPROM), programmable ROM (PROM), magnetic memory, magnetic disc, and optical disc.

The memory 1100 may store at least one software module including instructions. Each software module may be executed by the processor 1200 such that the mobile device 1000 performs a certain operation or function. For example, as shown in FIG. 2, a natural language processing module, a command management module, a condition determination module, and an event handler module may be executed by the processor 1200, but an embodiment of the disclosure is not limited thereto, and other software modules may be further included.

The processor 1200 may execute the instructions stored in the memory 1100 or the programmed software module to control the operation or function performed by the mobile device 1000. The processor 1200 may include a hardware component performing arithmetic operations, logic operations, input/output operations, and signal processing.

The processor 1200 may include, for example, at least one piece of hardware from among a central processing unit (CPU), a micro-processor, a graphics processing unit (GPU), an application specific integrated circuit (ASIC), a digital signal processor (DSP), a digital signal processing device (DSPD), a programmable logic device (PLD), and a field programmable gate array (FPGA), but is not limited thereto.

The location sensor 1460 may detect a location of the mobile device 1000 among context information. For example, the location sensor 1460 may be a global positioning system (GPS), and may indicate the location of the mobile device 1000 in coordinate values of altitude and/or latitude.

The communication interface 1500 may be connected to a device located outside the mobile device 1000 to transmit, to the device located outside, a command or information generated or obtained by the mobile device 1000, or receive various types of information from the device located outside. The communication interface 1500 may perform communication with another device or network. In the on-device IoT environment, the communication interface 1500 may include a communication module supporting at least one of various short-range communication methods. For example, the communication interface 1500 may include a communication module performing short-range communication, such as wireless fidelity (Wi-Fi) or Bluetooth.

The microphone 1620 may receive an utterance input of a user. The microphone 1620 may receive a voice of the user and process the voice as electronic voice data.

The timer 1700 may detect a time among the context information. The timer 1700 may be embedded inside the mobile device 1000 or may be a device that receives, in real-time, a current time from an outside source and provides the current time.

According to such a configuration, the processor 1200 may execute one or more instructions stored in the memory 1100 to extract, from the utterance input of the user, element information of a command controlling the target device 2000 and detection condition information of the target device 2000, detect the context information (e.g., first context information) by using the location sensor 1460 and the timer 1700, and determine whether the detected context information satisfies the detection condition information of the target device 2000. The processor 1200 may process the command controlling the target device 2000, based on a result of the determination.

In a case where the detected context information does not satisfy the detection condition information of the target device 2000, the processor 1200 may register the command in a command list and detect a change in the context information. In other words, the processor 1200 may wait for the context information to change before processing the command controlling the target device 2000. The processor 1200 may register the command in the command list stored in the mobile device 1000 and detect whether there is a change in the context information (e.g., to second context information) until the target device 2000 is detectable. In other words, the processor 1200 may cause the mobile device 1000 to be in a standby state until the context information satisfies the detection condition information of the target device 2000, i.e., until the mobile device 1000 enters the on-device IoT environment of the target device 2000.

In a case where the detected context information satisfies the detection condition information of the target device 2000, the processor 1200 may detect the target device 2000 and transmit the command to the target device 2000. When the mobile device 1000 enters the on-device IoT environment of the target device 2000, the processor 1200 may perform a process of detecting the target device 2000 and transmit the command to the detected target device 2000.

In a case where the detected context information satisfies the detection condition information of the target device 2000, and when the target device 2000 is not detected via the communication interface 1500, the processor 1200 may register the command in the command list. The processor 1200 according to an embodiment of the disclosure may periodically perform the process of detecting (e.g., attempting to detect) the target device 2000 again via the communication interface 1500, and transmit the command registered in the command list to the target device 2000 when the target device 2000 is detected. The processor 1200 according to an embodiment of the disclosure may perform the process of detecting (e.g., attempting to detect) the target device 2000 again via the communication interface 1500 when movement of the mobile device 1000 is detected, and transmit the command registered in the command list to the target device 2000 when the target device 2000 is detected. The processor 1200 according to an embodiment of the disclosure may perform the process of detecting (e.g., attempting to detect) the target device 2000 again when a certain request signal is received from an external device, via the communication interface 1500, and transmit the command registered in the command list to the target device 2000 when the target device 2000 is detected.

In a case where the detected context information satisfies the detection condition information of the target device 2000, and when the target device 2000 is not detected via the communication interface 1500 and then the detection condition information is no longer satisfied because the context information detected by using at least one of the location sensor 1460 or the timer 1700 is changed, the processor 1200 may perform an action corresponding to inadequate detection condition information. For example, in a case where the detected context information satisfies the detection condition information of the target device 2000, and when the target device 2000 is not detected via the communication interface 1500 and then the detection condition information is no longer satisfied because the location information detected by using the location sensor 1460 is changed, the processor 1200 may output a message indicating that there is an un-transmitted command instead of transmitting the command to the target device 2000. As an example, in a case where the detected context information satisfies the detection condition information of the target device 2000, and when the target device 2000 is not detected via the communication interface 1500 and then the detection condition information is no longer satisfied because the time information detected by using the timer 1700 is changed, the processor 1200 may output a message indicating that a task related to an un-transmitted command is canceled instead of transmitting the command to the target device 2000.

In a case where the detected context information does not satisfy the detection condition information of the target device 2000, the processor 1200 may register the command in a command list. When the context information detected by using the location sensor 1460 and the timer 1700 is changed and thus the detection condition information of the target device 2000 is satisfied, the processor 1200 may, via the communication interface 1500, detect the target device 2000 and transmit the command registered in the command list to the target device 2000.

There may be a case where the utterance input of the user includes a reservation time of a function to be performed by the target device 2000 but the target device 2000 does not support a reservation function. In this case, the processor 1200 according to an embodiment of the disclosure may, when the detected context information satisfies the detection condition information of the target device 2000, receive a signal indicating that reservation is impossible from the target device 2000 in response to the detecting of the target device 2000 via the communication interface 1500 and transmitting the command to the target device 2000. The processor 1200 may generate a command in a form from which the reservation time is removed, register the command in the command list, and perform the process of detecting the target device 2000 again at the reservation time via the communication interface 1500 to transmit the command registered in the command list to the target device 2000. The processor 1200 according to an embodiment of the disclosure may identify whether the target device 2000 supports the reservation function, based on information on model-wise reservation function supportability of the target device 2000. When the target device 2000 does not support the reservation function, the processor 1200 may generate the command in the form from which the reservation time is removed, register the command in the command list, and detect the context information by using the location sensor 1460 and the timer 1700 at the reservation time. The processor 1200 may determine whether the detected context information satisfies the detection condition information of the target device 2000, by comparing the detected context information with the detection condition information of the target device 2000. The processor 1200 may determine that the detected context information satisfies the detection condition information of the target device 2000 and perform the process of detecting the target device 2000. The processor 1200 may detect the target device 2000 and transmit, to the target device 2000, the command in the form from which the reservation time is removed and registered in the command list.

Figure 3:
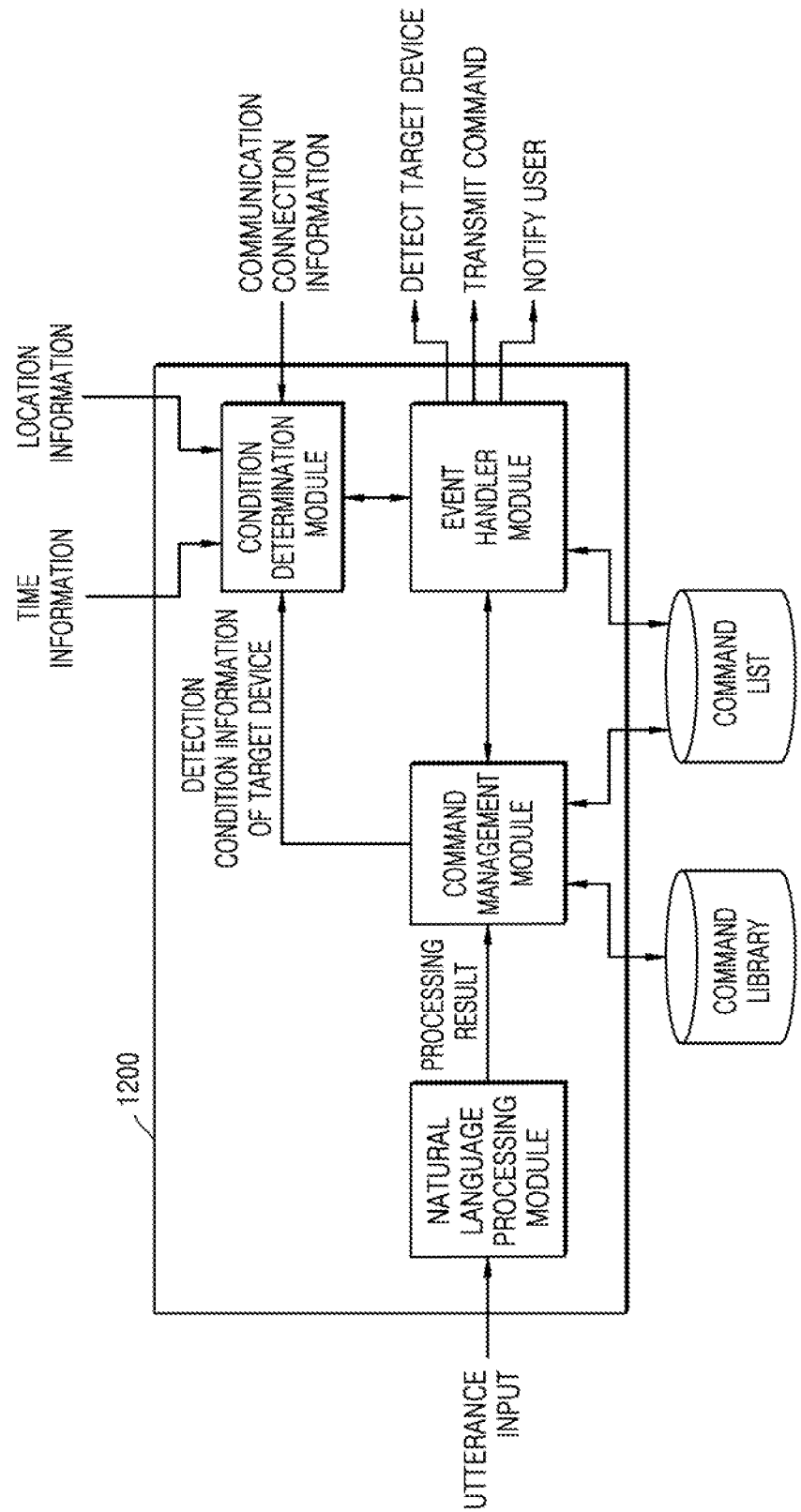
FIG. 3 is a diagram for describing operations of a processor, according to an embodiment.

FIG. 3 is a diagram for describing operations of the processor 1200, according to an embodiment of the disclosure.

Referring to FIG. 3, the processor 1200 may call and execute the natural language processing module, command management module, condition determination module, and event handler module stored in the memory 1100.

The natural language processing module may receive the utterance input of the user and perform natural language processing. The natural language processing module may convert the utterance input into text via natural language analysis and natural language understanding and transmit a result of the natural language processing to the command management module.

The command management module may extract, from a processing result of the natural language processing module, element information of the command controlling the target device 2000 and the detection condition information of the target device 2000, and generate the command controlling the target device 2000 by using a command library. The command management module may register the generated command in the command list when the mobile device 1000 is unable to transmit the command to the target device 2000.

The condition determination module may receive the detection condition information of the target device 2000 from the command management module, receive the location information from the location sensor 1460, receive the time information from the timer 1700, and receive communication connection information with an external device from the communication interface 1500. The condition determination module may determine, based on the received information, whether the context information detected by the mobile device 1000 (e.g., the location information and the time information) satisfies the detection condition information of the target device 2000, detect a change in the context information, or determine whether the target device 2000 has been detected.

The event handler module may process the command generated by the mobile device 1000, based on a result of the determination by the condition determination module. Also, the event handler module may perform the operation of detecting the target device 2000, transmit the command to the target device 2000, or provide a notification to the user by outputting a certain message via voice or an image, according to the result of the determination by the condition determination module.

Figure 4:
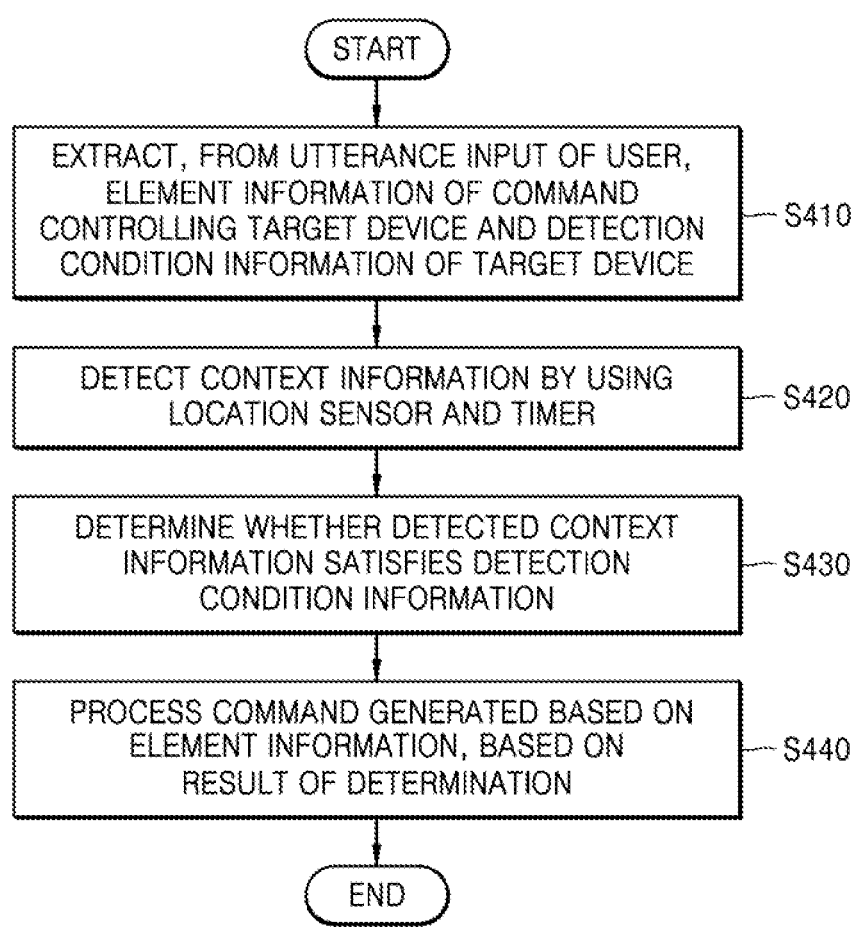
FIG. 4 is a flowchart of a method, performed by a mobile device, of processing a command based on an utterance input, according to an embodiment.

FIG. 4 is a flowchart of a method, performed by the mobile device 1000, of processing the command based on the utterance input, according to an embodiment of the disclosure. Detailed descriptions about terms and details overlapping those described above will not be provided again below.

In operation S410, the mobile device 1000 may extract, from the utterance input of the user, the element information of the command controlling the target device 2000 and detection condition information of the target device 2000.

In operation S420, the mobile device 1000 may detect the context information by using, for example, the location sensor 1460 and the timer 1700. The mobile device 1000 may obtain the location information from the location sensor 1460 and obtain the time information from the timer 1700.

In operation S430, the mobile device 1000 may determine whether the detected context information satisfies the detection condition information of the target device 2000. The mobile device 1000 may compare whether the location information and time information obtained from the location sensor 1460 and timer 1700 (e.g., the context information) match on-device IoT environment information of the target device 2000 (e.g., the detection condition information) extracted from the utterance input.

In operation S440, the mobile device 1000 may process the command generated based on the extracted element information, based on a result of the determination. In a case where the detected context information does not satisfy the detection condition information of the target device 2000, the mobile device 1000 may register the command in a command list and detect a change in the context information. In a case where the detected context information satisfies the detection condition information of the target device 2000, the mobile device 1000 may detect the target device 2000 and transmit the command to the target device 2000. When the mobile device 1000 enters the on-device IoT environment of the target device 2000, the process of detecting the target device 2000 may be performed and the command may be transmitted to the detected target device 2000.

Hereinafter, a method by which the mobile device 1000 processes the command will be described in detail with several examples according to whether the detection condition information of the target device 2000 is satisfied and whether detecting of the target device 2000 is successful, based on a change in the context information.

Figure 5:
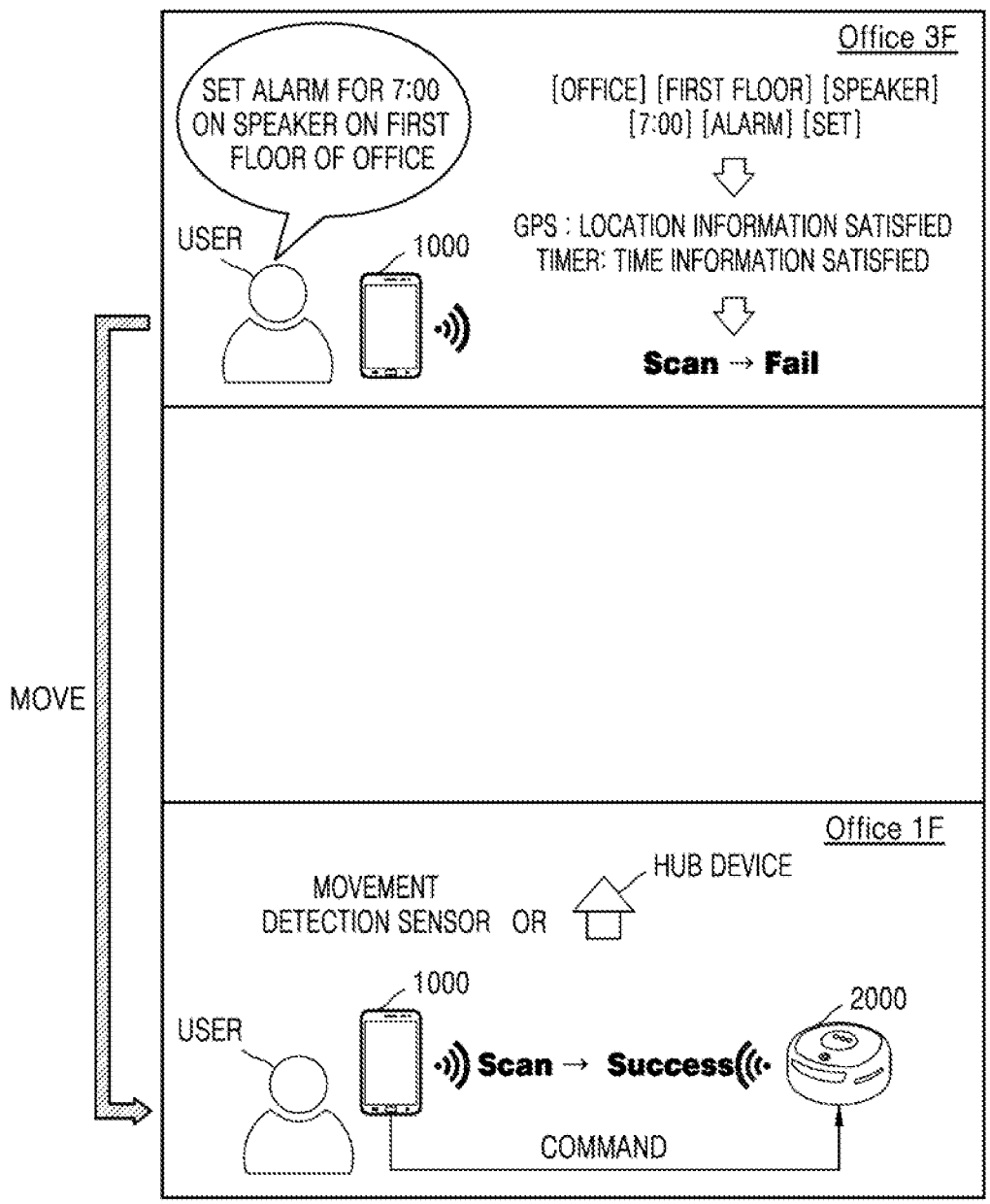
FIG. 5 is a diagram for describing an example of processing a command when a mobile device fails to detect a target device, according to an embodiment.

FIG. 5 is a diagram for describing an example of processing a command when the mobile device 1000 fails to detect the target device 2000, according to an embodiment of the disclosure.

Referring to FIG. 5, the mobile device 1000 may receive an utterance input of the user, such as "set alarm for 7:00 on speaker on first floor of office", and identify pieces of information in words, such as "[office] [first floor] [speaker]

[7:00] [alarm] [set]". The mobile device 1000 may extract, therefrom, element information configuring a command controlling the target device 2000 and detection condition information of the target device 2000. For example, the element information of the command controlling the target device 2000 may be "[office, first floor, speaker]" that may be identification information of the target device 2000, and "[7:00, alarm, set]" that may be information about a function to be performed by the target device 2000. The mobile device 1000 may generate the command controlling the target device 2000 from "[office, first floor, speaker]" and "[7:00, alarm, set]", by using a command library. The detection condition information of the target device 2000 may be "[office]" and "[7:00]", which are respectively location information and time information that may be on-device IoT environment information of the target device 2000.

Because the user is located at a third floor of the office with the mobile device 1000 during utterance, the mobile device 1000 may detect "location information of the office" and "current time information" as context information, by using the location sensor 1460 and the timer 1700.

The mobile device 1000 may compare the "location information of the office" and the "current time information", which are the detected context information, with "[office]" and "[7:00]" obtained as the detection condition information of the target device 2000, and determine whether the detected context information satisfies the detection condition information of the target device 2000.

As shown in FIG. 5, the mobile device 1000 may determine that the detected context information satisfies the detection condition information of the target device 2000 and thus perform the process of detecting the target device 2000. When the mobile device 1000 fails to detect the target device 2000, i.e., when detection of the target device 2000 fails, the mobile device 1000 may register the generated command in a command list.

Then, when a certain condition is satisfied, the mobile device 1000 may perform the process of detecting the target device 2000 again. For example, the mobile device 1000 may periodically perform the process of detecting the target device 2000 again according to pre-set cycles. As an example, the mobile device 1000 may perform the process of detecting (e.g., attempting to detect) the target device 2000 again when movement is detected via a movement detection sensor. As an example, the mobile device 1000 may perform the process of detecting the target device 2000 again when a certain request signal REQ is received from an external device, such as a hub device. As such, because the mobile device 1000 performs the process of detecting the target device 2000 again when a certain condition is satisfied, the user does not need to input the same utterance again and power consumption may be reduced.

The mobile device 1000 may detect the target device 2000 to transmit the COMMAND registered in the command list to the target device 2000.

Figure 6:
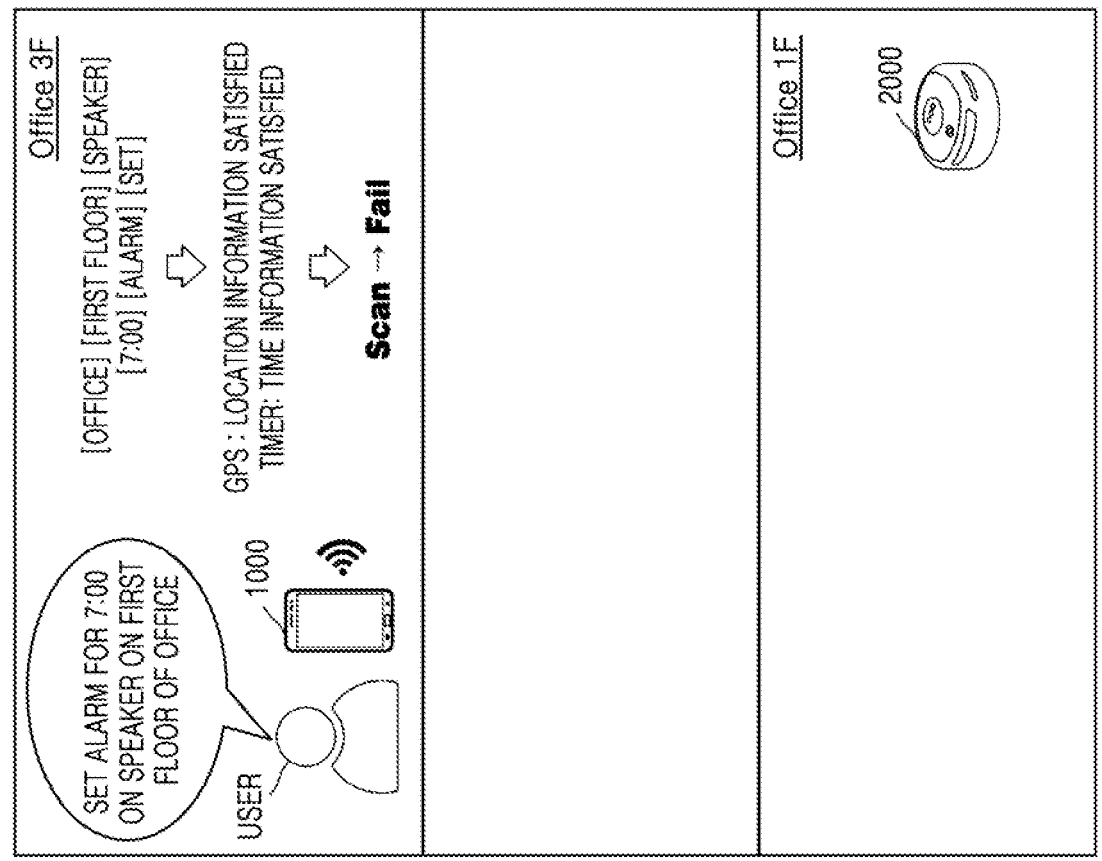
FIG. 6 is a diagram for describing an example of processing a command when context information does not satisfy detection condition information of a target device after a mobile device fails to detect the target device, according to an embodiment.
Figure 6:
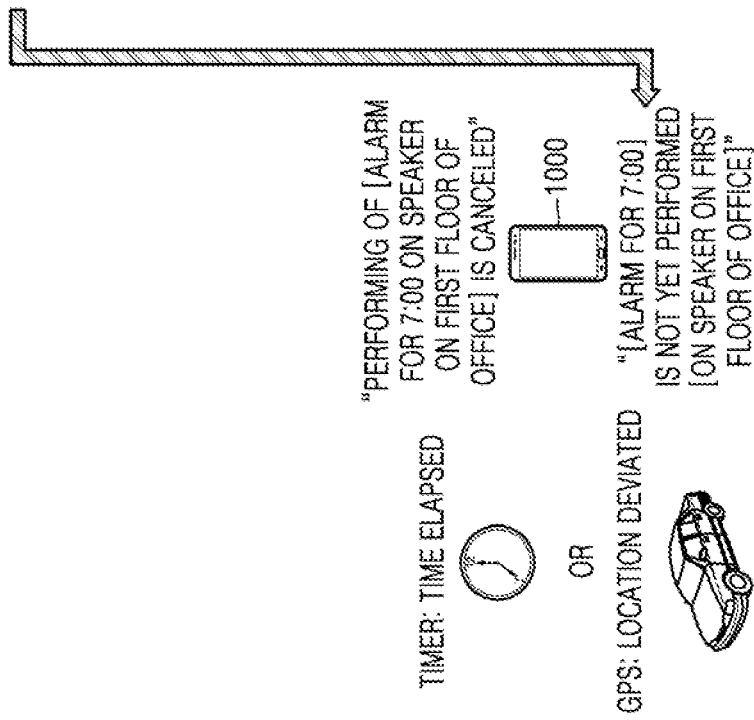

FIG. 6 is a diagram for describing an example of processing a command when context information does not satisfy detection condition information of the target device 2000 after the mobile device 1000 fails to detect the target device 2000, according to an embodiment of the disclosure.

Unlike FIG. 5 above where the user moves from the third floor to the first floor of the office with the mobile device 1000 that has failed to detect the target device 2000, FIG. 6 assumes a case where the user gradually moves away from the office with the mobile device 1000 that has failed to detect the target device 2000.

When the context information detected by using the location sensor 1460 and the timer 1700 satisfies the detection condition information of the target device 2000, the mobile device 1000 may perform the process of detecting the target device 2000. Thereafter, when the mobile device 1000 is unable to detect the target device 2000 and the context information detected by using at least one of the location sensor 1460 or the timer 1700 is changed and thus the detection condition information of the target device 2000 is no longer satisfied, the mobile device 1000 may perform an action corresponding to inadequate detection condition information.

For example, when the mobile device 1000 is unable to detect the target device 2000 and location information detected by using the location sensor 1460 is changed and thus the detection condition information of the target device 2000 is no longer satisfied, the mobile device 1000 may output a message indicating that there is an un-transmitted command. As shown in FIG. 6, when the user gradually moves away from the office with the mobile device 1000 that has failed to detect the target device 2000, without first moving to the first floor of the office, the mobile device 1000 may determine that the location information detected by using the location sensor 1460 is not the "office", and output a message indicating that an "alarm for 7:00" command that could not be transmitted to the speaker that is the target device 2000 on the first floor of the office is not yet performed, and a message asking whether to cancel a task related to the command.

As an example, when the mobile device 1000 is unable to detect the target device 2000 and time information detected by using the timer 1700 is changed and thus the detection condition information of the target device 2000 is no longer satisfied, the mobile device 1000 may output a message indicating that a task related to an un-transmitted command is canceled. As shown in FIG. 6, when 7:00 has passed while the user moves with the mobile device 1000 that has failed to detect the target device 2000, without first moving to the first floor of the office, the mobile device 1000 may determine from the time information detected by using the timer 1700 that "7:00" has passed and output a message that the task related to the "alarm for 7:00" command, which could not be transmitted to the speaker that is the target device 2000 on the first floor of the office, is canceled.

Figure 7:
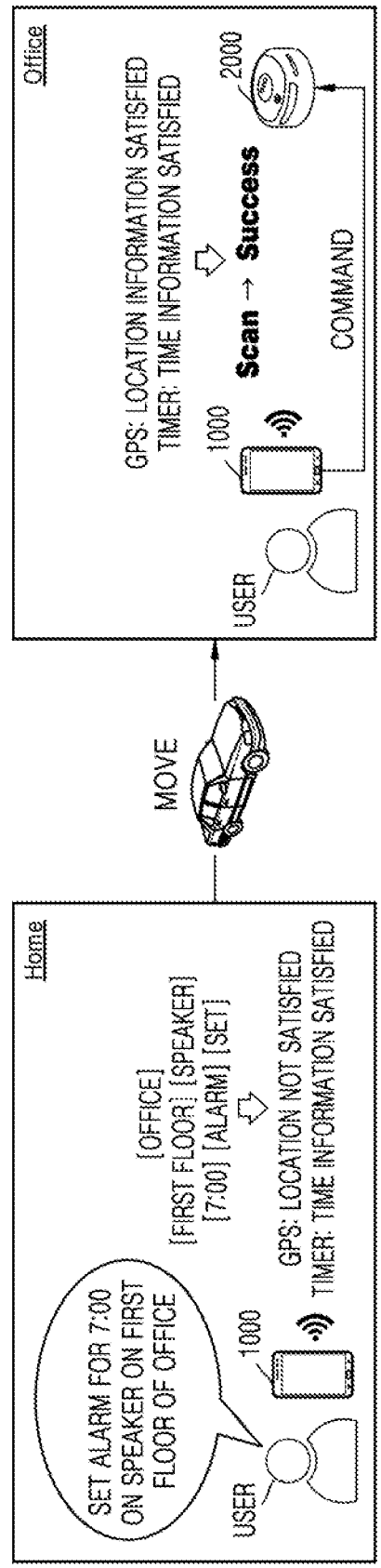
FIG. 7 is a diagram for describing an example of a mobile device processing a command when context information is changed and thus detection condition information of a target device is satisfied, according to an embodiment.

FIG. 7 is a diagram for describing an example of the mobile device 1000 processing a command when context information is changed and thus detection condition information of the target device 2000 is satisfied, according to an embodiment of the disclosure.

As described above with reference to FIG. 5, the mobile device 1000 may identify pieces of information in words, such as "[office] [first floor] [speaker] [7:00] [alarm] [set]" from an utterance input of the user, such as "set alarm for 7:00 on speaker on first floor of office", and extract, therefrom, element information configuring a command controlling the target device 2000 and the detection condition information of the target device 2000.

In FIG. 7, because the user is located at home with the mobile device 1000 during utterance, the mobile device 1000 may detect "location information of home" and "current time information" as context information, by using the location sensor 1460 and the timer 1700.

The mobile device 1000 may compare the "location information of home" and the "current time information", which are the detected context information, with "[office]" and "[7:00]" obtained as the detection condition information of the target device 2000, and determine whether the detected context information satisfies the detection condition information of the target device 2000.

As shown in FIG. 7, the mobile device 1000 may determine that detected location information does not satisfy the detection condition information of the target device 2000 and thus register the generated command in a command list. Thereafter, when the context information detected by using the location sensor 1460 and the timer 1700 is changed to "location information of the office" and "current time information" as the user moves to an office with the mobile device 1000, thereby satisfying the detection condition information of the target device 2000, the mobile device 1000 may perform a process of detecting the target device 2000. The mobile device 1000 may detect the target device 2000 to transmit the COMMAND registered in the command list to the target device 2000.

Figure 8:
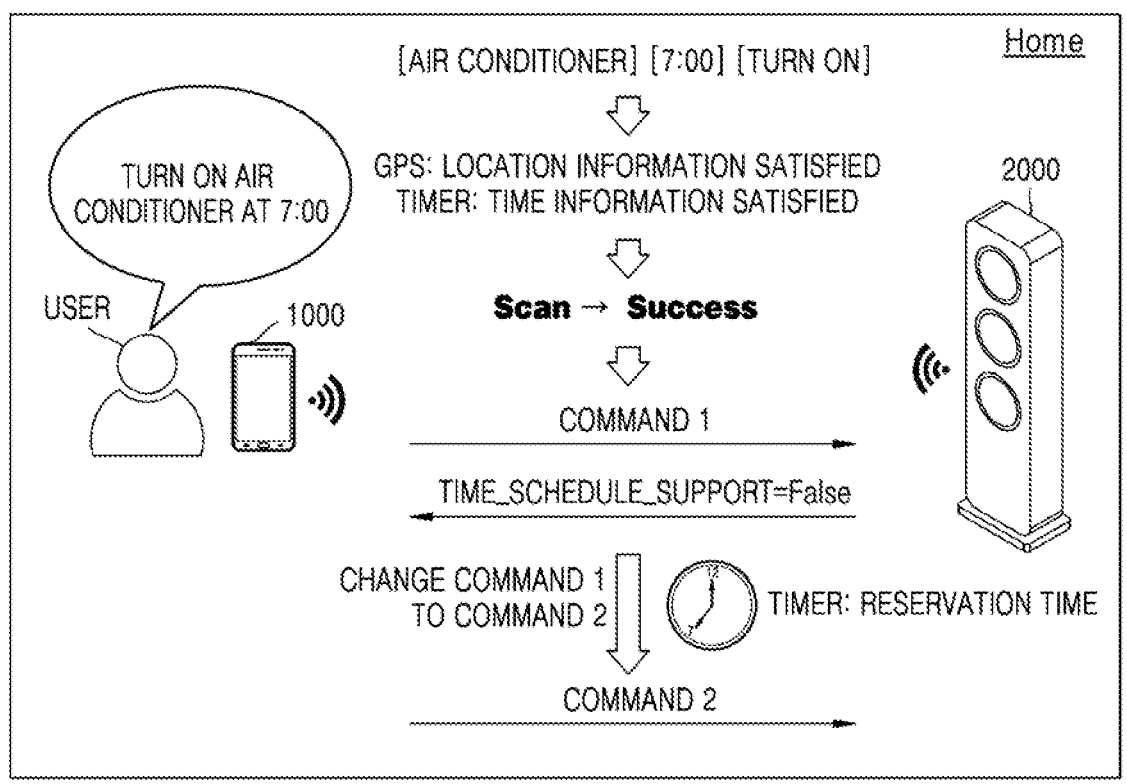
FIG. 8 is a diagram of an example of expanding a function supported by a target device via a mobile device when the target device does not support a reservation function.

FIG. 8 is a diagram of an example of expanding a function supported by the target device 2000 via the mobile device 1000 when the target device 2000 does not support a reservation function.

Referring to FIG. 8, the mobile device 1000 may receive an utterance input of the user, such as "turn on air conditioner at 7:00", and identify pieces of information in words, such as "[7:00] [air conditioner] [turn on]". The mobile device 1000 may extract, therefrom, element information configuring a command controlling the target device 2000 and detection condition information of the target device 2000. For example, the element information of the command controlling the target device 2000 may be "[air conditioner]" that may be identification information of the target device 2000, and "[7:00, turn on]" that may be information about a function to be performed by the target device 2000. The mobile device 1000 may generate the command controlling the target device 2000 from "[air conditioner]" and "[7:00, turn on]", by using a command library. The detection condition information of the target device 2000 is location information and time information that may be on-device IoT environment information of the target device 2000, and when there is no information related to the location information in the utterance input of the user, current location information may be applied as a default value. In FIG. 8, "[home]" and "[7:00]" may be the detection condition information of the target device 2000.

Because the user is located at home with the mobile device 1000 during utterance, the mobile device 1000 may detect "location information of home" and "current time information" as context information, by using the location sensor 1460 and the timer 1700.

The mobile device 1000 may compare the "location information of home" and the "current time information", which are the detected context information, with "[home]" and "[7:00]" obtained as the detection condition information of the target device 2000, and determine whether the detected context information satisfies the detection condition information of the target device 2000.

As shown in FIG. 8, the mobile device 1000 may determine that the detected context information satisfies the detection condition information of the target device 2000 and thus perform the process of detecting the target device 2000. The mobile device 1000 may detect the target device 2000 and transmit, to the target device 2000, a COMMAND 1 generated from "[air conditioner]" and "[7:00, turn on]". Here, when the air conditioner that is the target device 2000 does not have a reservation function, the mobile device 1000 may receive a signal (TIME_SCHEDULE_SUPPORT=False) indicating that reservation is impossible from the target device 2000, in response to the transmitting of the COMMAND 1 to the target device 2000.

The mobile device 1000 may generate a COMMAND 2 in a form from which a reservation time is removed, by removing "7:00" from "[air conditioner]" and "[7:00, turn on]", which are the element information of the command, and register the COMMAND 2 in a command list. The mobile device 1000 may perform a process of detecting the target device 2000 again at "7:00" that is the reservation time, and transmit the COMMAND 2 registered in the command list to the target device 2000.

As a result, when the utterance input of the user includes the reservation time of the function to be performed by the target device 2000 but the air conditioner that is the target device 2000 does not support the reservation function, the mobile device 1000 may transmit the command to the target device 2000 at the reservation time, thereby achieving an effect as if the target device 2000 supports the reservation function.

Figure 9:
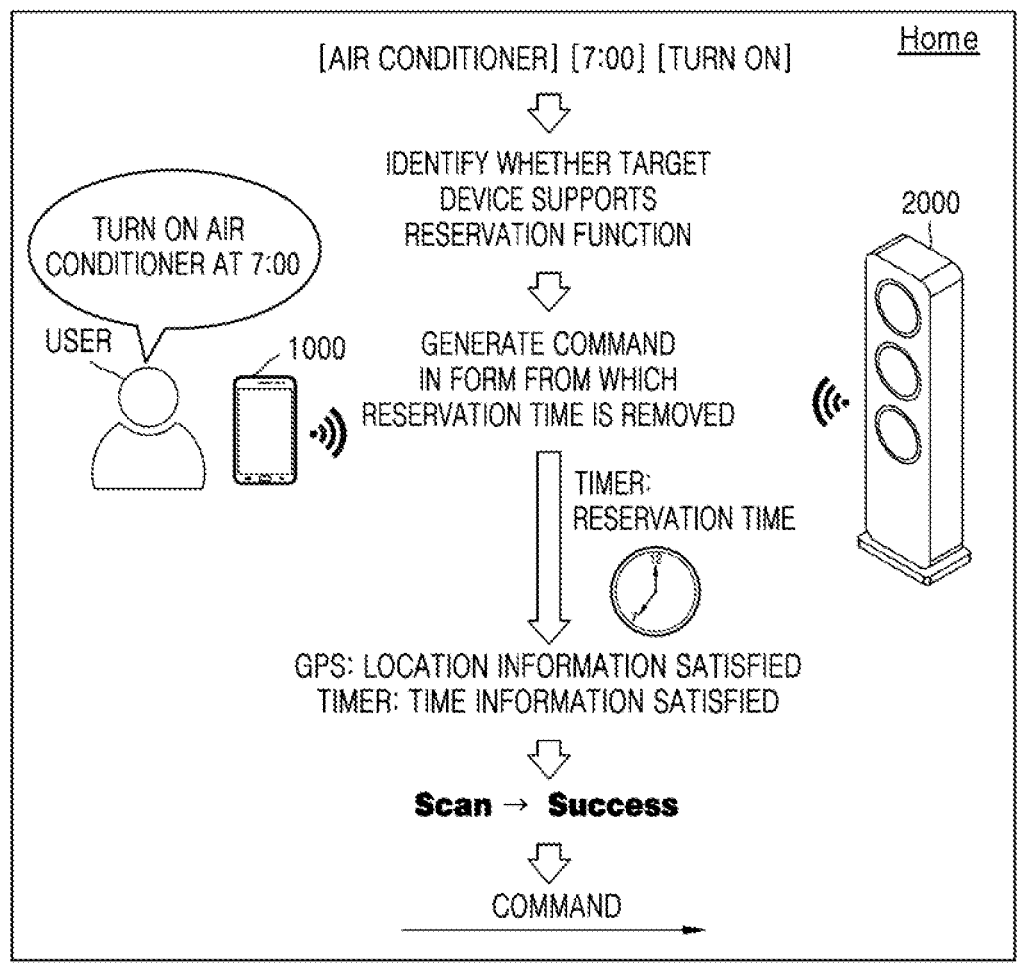
FIG. 9 is a diagram of an example of expanding a function supported by a target device via a mobile device when the target device does not support a reservation function.

FIG. 9 is a diagram of an example of expanding a function supported by the target device 2000 via the mobile device 1000 when the target device 2000 does not support a reservation function.

Referring to FIG. 9, the mobile device 1000 may receive an utterance input of the user, such as "turn on air conditioner at 7:00", and identify pieces of information in words, such as "[7:00] [air conditioner] [turn on]". The mobile device 1000 may extract, therefrom, element information configuring a command controlling the target device 2000 and detection condition information of the target device 2000. Here, when the utterance input of the user includes a reservation time of a function to be performed by the target device 2000, the mobile device 1000 may identify whether the target device 2000 supports a reservation function, based on information on model-wise reservation function supportability of the target device 2000. When the target device 2000 does not support the reservation function, the mobile device 1000 may generate a command in a form from which the reservation time is removed by removing "7:00" from "[air conditioner]" and "[7:00, turn on]", which are element information of the command, and register the command in a command list.

The mobile device 1000 may detect context information by using the location sensor 1460 and the timer 1700 at "7:00" that is the reservation time. Because the user is located at home with the mobile device 1000 during utterance, the mobile device 1000 may detect "location information of home" and "current time information" as the context information, by using the location sensor 1460 and the timer 1700.

The mobile device 1000 may compare the "location information of home" and the "current time information", which are the detected context information, with the detection condition information of the target device 2000, and determine whether the detected context information satisfies the detection condition information of the target device 2000.

As shown in FIG. 9, the mobile device 1000 may determine that the detected context information satisfies the detection condition information of the target device 2000 and thus perform the process of detecting the target device 2000. The mobile device 1000 may detect the target device 2000 and transmit, to the target device 2000, the COMMAND in the form from which the reservation time is removed and registered in the command list.

As a result, when the utterance input of the user includes the reservation time of the function to be performed by the target device 2000 but the air conditioner that is the target device 2000 does not support the reservation function, the mobile device 1000 may process the command registered in the command list at the reservation time, thereby achieving an effect as if the target device 2000 supports the reservation function.

Figure 10:
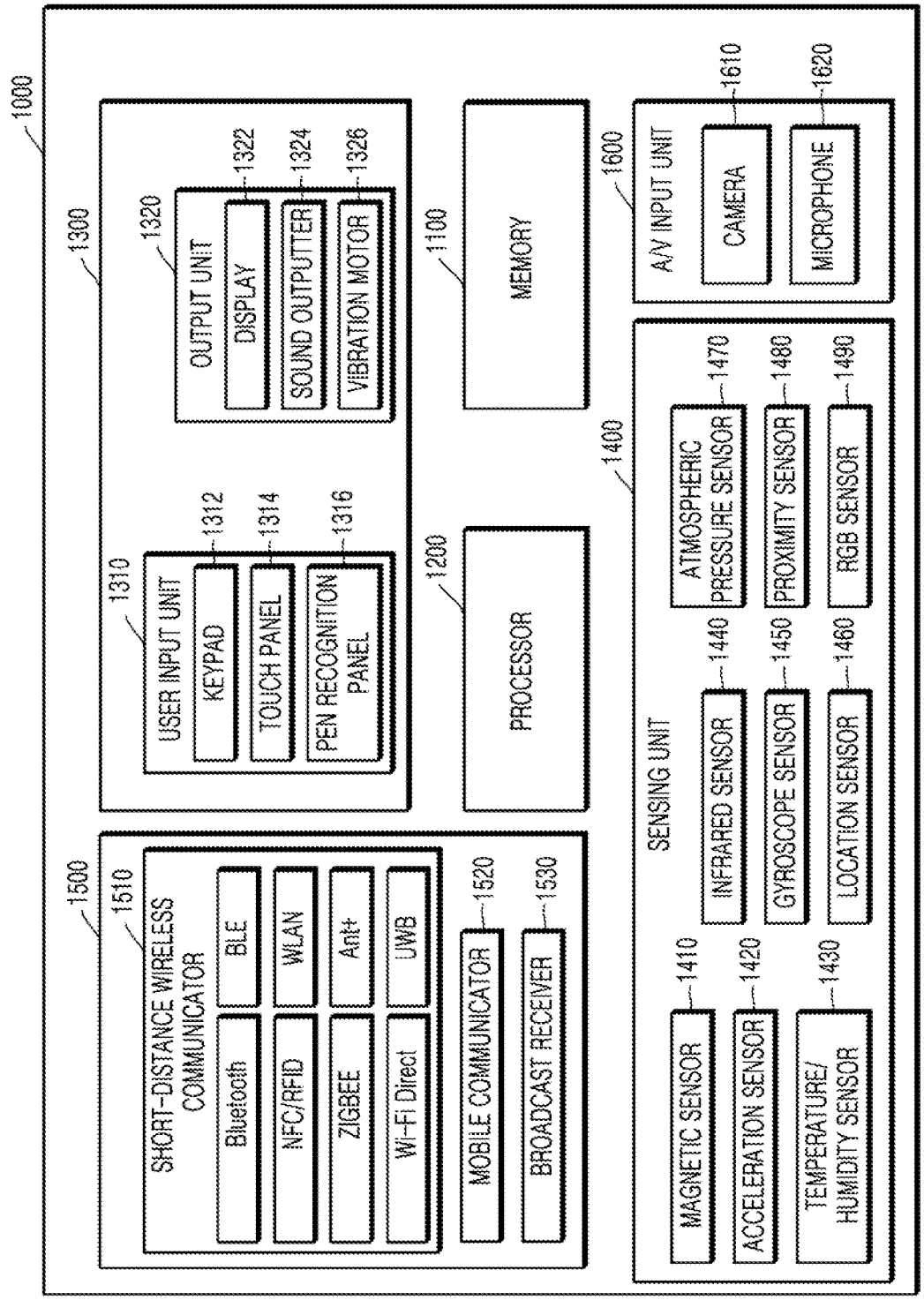
FIG. 10 is a block diagram for describing a configuration of a mobile device, according to an embodiment.

FIG. 10 is a block diagram for describing the mobile device 1000, according to an embodiment of the disclosure.

As shown in FIG. 10, the mobile device 1000 according to an embodiment of the disclosure may include the memory 1100, the processor 1200, an input/output (I/O) unit 1300, a sensing unit 1400, the communication interface 1500, and an audio/video (A/V) input unit 1600. Detailed descriptions about terms and details overlapping those described with reference to FIG. 2 above will not be provided again below.

The memory 1100 may store programs for processes and controls of the processor 1200 and may store data input to or output from the mobile device 1000. The memory 1100 may store a computer-executable instruction. The programs stored in the memory 1100 may be classified into a plurality of modules depending on functions.

For example, a user interface (UI) module may provide UIs, graphics user interfaces (GUIs), and the like for each application. A touch screen module may detect a touch gesture of the user on a touch screen and transmit information about the touch gesture to the processor 1200. The touch gesture of the user may include tap, touch and hold, double tap, drag, panning, flick, drag and drop, swipe and the like. A notification module may generate a signal for notifying event occurrence of the mobile device 1000. Examples of an event occurring in the mobile device 1000 may include message reception, key signal input, content input, content transmission, and detection of content corresponding to a certain condition. The notification module may output a notification signal in a form of a video signal via a display 1322, output a notification signal in a form of an audio signal via a sound outputter 1324, or output a notification signal in a form of a vibration signal via a vibration motor 1326.

The processor 1200 generally controls all operations of the mobile device 1000. For example, the processor 1200 may execute programs stored in the memory 1100 to control the I/O unit 1300, the sensing unit 1400, the communication interface 1500, and the A/V input unit 1600 in general. The processor 1200 may include at least one processing module. The processor 1200 may include a plurality of processing modules according to functions and operations thereof.

The I/O unit 1300 may include a user input unit 1310 and an output unit 1320. The I/O unit 1300 may be in a form in which the user input unit 1310 and the output unit 1320 are separated from each other or are integrated like a touch screen.

The user input unit 1310 is a unit into which data for the user to control the mobile device 1000 is input. The user input unit 1310 may include a keypad 1312, a touch panel 1314, and a pen recognition panel 1316. In addition, the user input unit 1310 may include a jog wheel or a jog switch, but is not limited thereto.

The output unit 1320 may output a result of executing an application in the mobile device 1000. The output unit 1320 may output an operation result of the mobile device 1000 and when there is a user input, output a result modified according to the user input. The output unit 1320 may output an audio signal, a video signal, or a vibration signal, and the output unit 1320 may include the display 1322, the sound outputter 1324, and the vibration motor 1326.

The display 1322 displays information processed by the mobile device 1000. For example, the display 1322 may display an execution screen of a voice assistant application or display a UI for receiving an input of user manipulation.

The sound outputter 1324 outputs audio data received from the communication interface 1500 or stored in the memory 1100. Also, the sound outputter 1324 outputs an audio signal related to a function performed by the mobile device 1000. The sound outputter 1324 may include a speaker, a buzzer, or the like.

The vibration motor 1326 may output a vibration signal. For example, the vibration motor 1326 may output a vibration signal corresponding to output of audio data or video data. Also, the vibration motor 1326 may output a vibration signal when a touch is input on the touch screen.

The sensing unit 1400 may detect a state of the mobile device 1000 or a state around the mobile device 1000 and transmit detected information to the processor 1200.

The sensing unit 1400 may include at least one of a magnetic sensor 1410, an acceleration sensor 1420, a temperature/humidity sensor 1430, an infrared sensor 1440, a gyroscope sensor 1450, the location sensor 1460 (for example, a GPS), an atmospheric pressure sensor 1470, a proximity sensor 1480, or a red, green, blue (RBG) sensor 1490 (illumination sensor), but is not limited thereto. Because functions of each sensor can be intuitively inferred by one of ordinary skill in the art from the name, detailed descriptions thereof will be omitted.

The communication interface 1500 may include one or more components enabling communication between the mobile device 1000 and another device or a server. The communication interface 1500 may perform communication with another device, a server, or a peripheral device to transmit/receive or upload content. For example, the communication interface 1500 may include a short-range wireless communicator 1510, a mobile communicator 1520, and a broadcast receiver 1530.

The short-range wireless communicator 1510 may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra-wideband (UWB) communicator, or an Ant+ communicator, but is not limited thereto.

The mobile communicator 1520 may transmit or receive a wireless signal to or from at least one of a base station, an external terminal, or a server, on a mobile communication network. Here, the wireless signal may include various types of data according to exchange of a voice call signal, an image call signal, or a text/multimedia message.

The broadcast receiver 1530 may receive a broadcast signal and/or information related to a broadcast from an external source through a broadcast channel. The broadcast channel may include a satellite channel or a terrestrial channel. According to an implementation example, the mobile device 1000 may not include the broadcast receiver 1530.

The A/V input unit 1600 is a unit into which an audio signal or a video signal is input, and may include a camera 1610 and the microphone 1620.

The camera 1610 may obtain an image frame such as a still image or moving image via an image sensor in an image call mode or photographing mode. An image captured via the image sensor may be processed via the processor 1200 or a separate image processor (not shown). The image frame processed by the camera 1610 may be stored in the memory 1100 or transmitted to an external device via the communication interface 1500. There may be two or more cameras 1610 according to an implementation of the mobile device 1000.

The microphone 1620 receives an external sound signal and processes the external sound signal to electric voice data. For example, the microphone 1620 may receive a sound signal from an external device or an utterer. The microphone 1620 may use various noise removal algorithms to remove noise generated while the external sound signal is received.

The method of processing a command based on an utterance input described in the disclosure may be implemented by a hardware component, a software component, and/or a combination of a hardware component and a software component. For example, the method of processing a command based on an utterance input described in embodiments of the disclosure may be implemented by using one or more general-purpose components or special-purpose components, such as a processor, an arithmetic logic unit (ALU), an application-specific integrated circuit (ASIC), a digital signal processor (DSP), a digital signal processing device (DSPD), a programmable logic device (PLD), a microcomputer, a microprocessor, or any other device capable of executing and responding to an instruction.

The software may include a computer program, a code, an instruction, or a combination thereof, and may configure the processing device to operate as desired or instruct the processing device independently or collectively.

The software may be implemented as a computer program that includes instructions stored on computer-readable storage media. Examples of computer-readable recording medium include magnetic storage media (for example, read-only memory (ROM), random-access memory (RAM), floppy disc, and hard disc) and optical reading media (for example, CD-ROM and digital versatile disk (DVD). The computer-readable recording medium may be distributed over a computer system connected through a network, and computer-readable codes may be stored and executed in a distributed manner. The medium is readable by a computer, stored in a memory, and may be executed in a processor.

The computer is an apparatus capable of calling a stored instruction from a storage medium and operating according to an embodiment of the disclosure according to the called instruction, and may include the mobile device 1000 according to embodiments of the disclosure.

The computer-readable storage medium may be provided in the form of a non-transitory storage medium. The term "non-transitory" only means that a storage medium does not include a signal and is tangible, and does not distinguish whether data is stored in the storage medium semi-permanently or temporarily.

Furthermore, a method according to embodiments of the disclosure may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program electrically distributed through an electronic market (for example, App Store) or manufacturer of the mobile device 1000 or target device 2000. For electronic distribution, at least a part of the software program may be stored in a storage medium or temporarily generated. In this case, the storage medium may be a storage medium of a server of a manufacturer, a server of an electronic market, or a relay server that temporarily stores the software program.

The computer program product may include a storage medium of a server or a storage medium of a terminal, in a system including the server and the terminal (for example, the mobile device 1000). Alternatively, when there is a third device that communicates with the server or the terminal, the computer program product may include a storage medium of the third device. Alternatively, the computer program product may include the software program transmitted from the server to the terminal or the third device, or transmitted from the third device to the terminal.

In this case, one of the server, the terminal, and the third device may perform a method according to embodiments of the disclosure by executing the computer program product. Alternatively, two or more of the server, the terminal, and the third device may perform the method according to embodiments of the disclosure in a distributed fashion by executing the computer program product.

For example, a server, for example, a cloud server or an artificial intelligence server, may execute the computer program product stored in the server to control the terminal communicatively connected to the server to perform the method according to embodiments of the disclosure.

In an example, the third device may execute the computer program product to control the terminal communicatively connected to the third device to perform the method according to embodiments of the disclosure.

When the third device executes the computer program product, the third device may download the computer program product from the server and execute the downloaded computer program product. Alternatively, the third device may execute a computer program product provided in a preloaded state to perform the method according to embodiments of the disclosure.

As above, embodiments of the disclosure have been described by examples and drawings, but various changes and modifications are possible from the above description by one of ordinary skill in the art. For example, appropriate results may be achieved even when the described techniques are performed in an order different from the described method, components, such as an electronic device, a structure, and a circuit, are combined or associated in a form different from the described method, or replaced by other components or equivalents.

The invention claimed is:

1. A method, performed by a mobile device, of processing a command based on an utterance input of a user, the method comprising:
   extracting, from the utterance input of the user, element information corresponding to the command controlling a target device and detection condition information of the target device;
   detecting first context information using a location sensor and a timer;
   determining whether the detected first context information satisfies the detection condition information; and
   processing the command corresponding to the element information, based on a result of the determining,
   wherein, in a case where the utterance input comprises a reservation time of a function to be performed by the target device, the processing of the command comprises, in a case where the detected first context information satisfies the detection condition information, when a signal indicating that reservation is impossible is received from the target device in response to detecting the target device and transmitting the command to the target device:
generating the command in a form from which the reservation time is removed;
registering the command in a command list; and
performing a process of attempting to detect the target device again at the reservation time, and transmitting the command registered in the command list to the target device.

2. The method of claim 1, wherein the processing of the command comprises, in a case where the detected first context information does not satisfy the detection condition information, registering the command in a the command list and detecting a change in the first context information to second context information, and in a case where the second context information satisfies the detection condition information, detecting the target device and transmitting the command to the target device.

3. The method of claim 1, wherein the processing of the command comprises, in a case where the detected first context information satisfies the detection condition information, when the target device is not detected, registering the command in the command list and periodically performing a process of attempting to detect the target device again to transmit the command registered in the command list to the target device.

4. The method of claim 1, wherein the processing of the command comprises, in a case where the detected first context information satisfies the detection condition information, when the target device is not detected, registering the command in the command list, and when movement of the mobile device is detected, performing a process of attempting to detect the target device again to transmit the command registered in the command list to the target device.

5. The method of claim 1, wherein the processing of the command comprises, in a case where the detected first context information satisfies the detection condition information, when the target device is not detected, registering the command in the command list, and when a request signal is received from an external device, performing a process of attempting to detect the target device again to transmit the command registered in the command list to the target device.

6. The method of claim 1, wherein the processing of the command comprises, in a case where the detected first context information satisfies the detection condition information, when the target device is not detected and when the first context information detected using at least one of the location sensor or the timer is changed to second context information and thus the detection condition information is no longer satisfied, performing an action corresponding to the detection condition information that is no longer satisfied.

7. The method of claim 1, wherein the processing of the command comprises, in a case where the detected first context information does not satisfy the detection condition information, registering the command in the command list, and when the first context information detected using the location sensor and the timer is changed to second context information and thus the detection condition information is satisfied, detecting the target device and transmitting the command registered in the command list to the target device.

8. A non-transitory computer-readable recording medium having recorded thereon a program to be executed on a computer, the non-transitory computer- readable recording medium comprising instructions for:

extracting, from an utterance input of a user, element information corresponding to a command controlling a target device and detection condition information of the target device;
detecting first context information using a location sensor and a timer;
determining whether the detected first context information satisfies the detection condition information; and
processing the command corresponding to the element information, based on a result of the determination,
wherein, in a case where the utterance input comprises a reservation time of a function to be performed by the target device, the processing of the command comprises, in a case where the detected first context information satisfies the detection condition information, when a signal indicating that reservation is impossible is received from the target device in response to detecting the target device and transmitting the command to the target device:
generating the command in a form from which the reservation time is removed;
registering the command in a command list; and
performing a process of attempting to detect the target device again at the reservation time, and transmitting the command registered in the command list to the target device.

9. A mobile device comprising:
a location sensor configured to detect a location of the mobile device;
a timer;
a microphone configured to receive an utterance input of a user;
a communication interface;
a memory storing one or more instructions; and
a processor configured to execute the one or more instructions to:
extract, from the utterance input of the user, element information corresponding to a command controlling a target device and detection condition information of the target device;
detect first context information using the location sensor and the timer;
determine whether the detected first context information satisfies the detection condition information; and
process the command corresponding to the element information, based on a result of the determination,
wherein, in a case where the utterance input comprises a reservation time of a function to be performed by the target device, wherein the processor is further configured to execute the one or more instructions to:
identify whether the target device supports a reservation function, based on information on model-wise reservation function supportability of the target device, and when the target device does not support the reservation function, generate the command in a form from which the reservation time is removed;
register the command in a command list; and
detect the first context information using the location sensor and the timer at the reservation time.

10. The mobile device of claim 9, wherein the processor is further configured to execute the one or more instructions to, in a case where the detected first context information does not satisfy the detection condition information, register the command in the command list and detect a change in the first context information to second context information, and in a case where the second context information satisfies the detection condition information, detect the target device and transmit the command to the target device.

11. The mobile device of claim 9, wherein the processor is further configured to execute the one or more instructions to, in a case where the detected first context information satisfies the detection condition information, when the target device is not detected via the communication interface:
    register the command in the command list; and
    periodically perform a process of attempting to detect the target device again via the communication interface to transmit the command registered in the command list to the target device.

12. The mobile device of claim 9, wherein the processor is further configured to execute the one or more instructions to, in a case where the detected first context information satisfies the detection condition information, when the target device is not detected via the communication interface:
    register the command in the command list; and
    when movement of the mobile device is detected, perform a process of attempting to detect the target device again via the communication interface to transmit the command registered in the command list to the target device.

13. The mobile device of claim 9, wherein the processor is further configured to execute the one or more instructions to, in a case where the detected first context information satisfies the detection condition information, when the target device is not detected via the communication interface:
    register the command in the command list; and
    when a request signal is received from an external device via the communication interface, perform a process of attempting to detect the target device again to transmit the command registered in the command list to the target device.

* * * * *